Patented Sept. 27, 1938

2,131,145

UNITED STATES PATENT OFFICE 2,131,145

PROCESS FOR INCREASING THE REACTIVITY OF NATURALLY OR ARTIFICIALLY SHAPED ARTICLES OR MATERIALS AND PRODUCT OBTAINED THEREBY

Paul Schlack, Berlin-Treptow, Germany, assignor to I. G. Farbenindustrie Aktiengesellschaft, Frankfort-on-the-Main, Germany, a corporation of Germany No Drawing. Application September 12, 1935, Serial No. 40,352. In Germany September 15, 1934

9 Claims. (Cl. 8—120)

My present invention relates to a process for increasing the reactivity of naturally or artificially shaped articles.

One of its objects is to provide a process for increasing the reactivity of naturally or artificially shaped articles. Another object is the provision of structured proteinous materials having an increased affinity for treating agents of acid character. Further objects will be seen from the detailed specification following hereinafter.

This invention is based on the observation that artificially or naturally shaped articles or materials, which consist of or contain protein substances, their derivatives or substitution products, for example wool, chlorinated wool or wool pretreated with hydrogen peroxide, loaded or not loaded natural silk, artificial silk from fibroin, pelts, feathers, horsehair, horn, hardened or not hardened casein, gelatin sheets or capsules, tanned or raw hides, may be treated, if desired after the finishing process with alkylene oxide or a derivative or analogue or isologue thereof with retention of their structure so as to produce therein conversion products having an enhanced reactivity, particularly towards treatment with substances containing acid groups which may also have been converted into salt groups. Such acid treating agents are, for example, acylating agents, acid dyestuffs, natural or artificial tanning agents, acid mordants, acid loading agents, acid resists, acid insecticides.

The invention consists in the treatment of such shaped articles or materials with an alkyleneoxide, for example, ethylene-oxide, propyleneoxide, cyclohexene-oxide, epichlorhydrin, glycide, phenoxy-propenoxide, glycidic acids and their salts, salts of propylene-oxide sulfonic acid, 8-hydro-oxyquinoline-glycide-ether, ethyleneimine, N-methylethylene-imine, piperidopropenoxide, tri-ethyloxidopropyl-ammonium-chloride, furthermore alkylene sulfides, such as 1.2-propylene sulfide, and 1-chloro-2.3-propylene sulfide.

The ethylene-oxide body may be applied to the goods in the form of a solution in water or an organic solvent, or in the form of gas and at ordinary or raised temperature, under normal, diminished or increased pressure. When treating the material with a gas the efficiency of the action depends not only on the amount of vapor present in the mixture of air and vapor, in which form the treatment is preferably carried out, but also on the proportion of the amount of material, for instance wool to be treated, to the volume of the gaseous medium. When the proportion of wool to the volume of a mixture of epichlorhydrine vapor and air is 1:100 the quantity of epichlorhydrine may be 10 to 30 per cent calculated on the quantity of wool. When changing the aforesaid proportion of wool and gaseous mixture to 1:50 the upper limit of epichlorhydrine is reduced to about 25 per cent. With butylene oxide which is of slower reaction, a higher concentration is necessary for a useful effect. The proportions just given all refer to a treatment of the material for 8 to 16 hours at a temperature of 40 to 66° C. and a content of 60 to 100% of relative moisture in the air. The treatment may be localized by printing with a thickening agent which contains a slightly volatile or non-volatile ethylene-oxide or the salt of a glycidic acid or the like. The reaction may be carried out without the use of a catalyst. However, the reaction may be promoted by a catalyst such as an amine, for instance, triethylamine, diethylaniline, isopropylaniline, salts of a water soluble and even difficultly soluble base with an acid capable of reacting with alkylene oxides, for instance, sodium acetate, sodium chloride, calcium chloride, ammoniumchloride, tetramethylammoniumchloride, dodecyltrimethylammoniumchloride. Small quantities of amine, for instance, 1 to 5 per cent triethylamine are already sufficient. It is also recommended, that at the beginning of the operation the medium should be slightly acid. For example the material may be wetted with dilute acetic acid. In the course of the reaction the acidity is consumed. There may also be present in the reaction a swelling agent, for instance, formamide, acetamide, thiourea, phenol, resorcinol, salicylic acid, sodium salicylate, potassium thiocyanate, sodium cresol sulfonate, furthermore oxidizing or reducing bleaching agents or known preserving agents against deleterious influence of alkali.

The enhanced affinity for acid dyestuffs is particularly important in the case of wool. It permits the use of a lower temperature in dyeing mixtures of wool with acetate artificial silk, which is not stable to boiling, without diminishing the exhaustion of the dyestuff; or the diminution of the addition of acid to top dyeing, so that a direct dyeing acetate dyestuff which is only moderately fast to top dyeing is less superficially adsorbed by the wool or silk and purer two-color effects faster to rubbing are produced. Also in dyeing or topping halfwool in a neutral Glauber's salt bath with acid dyestuffs the improvement of the affinity of the wool is of importance.

The increase of the affinity of the wool for the dyestuff is of especial interest in printing. In this case the adsorptive capacity of the fiber has hitherto been improved to a considerable extent by chlorination which, however, may give rise to considerable damage of the fiber, particularly noticeable as a falling-off the wet tenacity.

The increase of the affinity for acid agents corresponds with a diminution of the affinity for basic substances if there is no acid residue introduced together with or during the treatment. One obtains, therefore, on wool or natural silk, which has been treated with propylene-oxide or preferably epichlorhydrin for example, dyeings of diminished depth with basic dyestuffs such as Methyl-Violet. This strengthening of the basic properties becomes even more marked when the treating agent contains basic nitrogen, for instance when piperido-propenoxide is used.

By combination of treated and untreated material valuable variegated effects can be obtained, for example, powerful mixed tints can be produced in which the difference in depth of tint may be varied by varying the temperature of dyeing or the proportion of acid added or both. By topping or grounding with basic dyestuffs or by the simultaneous use of more than one acid dyestuff of relatively different affinity to the treated and untreated material two-color effects may be obtained. Obviously the treatment is not limited to individual materials; mixed fibers, for instance, mixed yarn of acetate artificial silk and wool, mixed yarn of viscose staple fiber and wool, mixed fabrics, garments which are to be re-dyed and old material may equally well be treated according to the invention.

On treating keratin products with alkylene oxides of relatively low molecular weight, for instance, with propylene oxide or epichlorhydrine, the substitution can proceed until the molecule of keratin has been charged with 0.17 radicals of alkylene oxide on one atomic proportion of nitrogen. In this reaction there may be introduced into the amino groups of the material, for instance, the omega amino group of the lysine radical more than one hydroxyalkyl group. This reaction may proceed to the formation of quaternary salt groups. Correspondingly the products do no longer produce a reaction with triketohydrindene. The hydroxyalkyl groups can be identified by acetylation with acetic anhydride and determination of the bound acetyl groups.

It may remain an unanswered question whether and to what degree other groups than basic groups ahe modified or substituted.

The following examples illustrate the invention:

*Example 1.*—Zephyr wool is treated in a liquor ratio of 1:40 for 8 hours at 40° C. with a solution of propylene-oxide in water of 1 per cent strength. The wool, apart from quite light yellowing, is apparently unchanged, further it exhibits, particularly in neutral or acid dyebaths, an essentially stronger affinity to acid dyestuffs, for instance, Alizarine Direct Blue A (Schultz Farbstofftabellen, 7th edition, vol. 2, page 9), than does a comparative sample which has been similarly treated with water alone. If 2 per cent of triethylamine calculated on the quantity of wool is added to the propylene-oxide solution with which the wool is treated the dyeings are still deeper. The affinity to basic dyestuffs, for instance, Methyl Violet, is diminished to a corresponding extent. The treated wool is also more easily acetylated and less subject to the attack of textile pests.

If the wool is in the form of spun material, for instance cardings, the known dyeing apparatus may be used for the treatment.

*Example 2.*—The same wool as is prescribed in Example 1 (1 part by weight) is heated to 50° C. in a moist condition for 8 hours in the vapor of propylene-oxide (½ part). It now behaves towards dyestuffs similarly to that of the treated material prescribed in Example 1. In like manner yarn material, for example woolen crepe sliver, may be improved; the dry and wet tenacity is not varied by the action of the propylene-oxide.

*Example 3.*—Loaded and not loaded natural silk are heated as described in Example 2 for 8 hours in a chamber at 40° C. containing air laden with ethylene-oxide. In both cases the affinity of the treated silk for acid dyestuffs, for instance, Eosin S (Schultz Farbstofftabellen, 7th edition, vol. 1, No. 883), Azo Wool Blue (Schultz Farbstofftabellen, 7th edition, vol. 1, No. 103) and Alizarine Direct Blue A (Schultz Farbstofftabellen, 7th edition, vol. 2, page 9) is notably increased. Externally the silk remains unchanged.

*Example 4.*—Woolen piece goods are saturated with a solution of 10 per cent strength of glycide in water and then centrifuged. The impregnated material is not externally changed by being heated at 40° C. for 9 hours but has acquired a considerably increased affinity for acid dyestuffs.

*Example 5.*—Horn shavings are heated for 10 hours in a closed vessel at 60° C. with an aqueous solution of 10 per cent strength of propylene-oxide. The drained and dried shavings can be dyed with Alizarine Direct Blue A more deeply than a sample of the original horn which has been heated with water alone.

*Example 6.*—Alum-tanned leather is suspended in moist condition for 8 hours in air containing ethylene oxide and at 50° C. The treated leather is dyed by means of said dyestuffs more intensely than that which has not been treated.

*Example 7.*—A mixed yarn containing about 50% of wool and 50% of artificial fibers from viscose cut into staples are stored for 16 hours at 40° C. in air containing vapor of propylene oxide. When dyeing this yarn in 1% solution of Pegubrown (Schultz Farbstofftabellen, 7th edition, vol. 2, page 173) the fiber thus treated is dyed a darker shade already at 50 to 85° C. and shows a more uniform coloring than the untreated material.

*Example 8.*—Press-moulded plates made of the condensation product of casein and formaldehyde are immersed for 10 hours at 30° C. in an aqueous solution of 10 per cent strength of propylene-oxide. Even after thorough washing the treated plates can be dyed with acid dyestuffs essentially more intensely than the like plates which have been immersed in water only at 30° C. for the same period.

*Example 9.*—A lady's dress material made from a yarn containing a mixture of 50 per cent of wool and 50 per cent of viscose fibers cut into staples, is impregnated at room temperature with a 10 per cent solution of the spirocyclic quaternary ammonium salt obtained from chlorohydroxy propyl piperidine by rearrangement, after 20 minutes the liquid is removed by pressure and then the material is stored for 16 hours at 40° C. The affinity of the material especially of the wool contained in the material to dyes containing acid groups, for instance, Alizarine Direct Blue A (Schultz Farbstofftabellen, 7th edition, vol. 2, page 9), Orange 2, (Schultz Farbstofftabellen 7th edition, No. 189), Thiazine Red R (Schultz Farbstofftabellen, 7th edition, vol. 1, No. 277) and Pegubrown (Schultz Farbstofftabellen, 7th edition, vol. 2, page 173), is considerably increased.

It is possible, to dye both components of the yarn of the tissue made therefrom in the same tint at a relatively low temperature so that the material is not damaged.

The same effect is obtained if there is used the quaternary ammonium salt produced by intramolecular alkylation of beta-chlorethyl-diethlamine instead of the piperidine derivative.

*Example 10.*—Wool yarn is treated at room temperature with a preferably freshly prepared about 10 per cent solution of 1.2-propyleneoxide-3-sulfonic-potassium obtainable by the addition of the equimolecular quantity of potassium hydroxide to a solution of gamma-chloro-beta-hydroxy-propane-α-sulfonic potassium for 20 minutes, centrifuged and heated to 40° C. for about 12 hours. The affinity to acid dyes is diminished owing to the presence of a sulfo group the affinity to basic dyes, for instance Methyl-Violet (Schultz Farbstofftabellen, 7th edition, vol. 1, No. 783) is considerably increased. The wool thus treated shows an increased capability for being wetted and can be dyed a deep shade at a relatively low temperature.

These facts show that in treating the wool according to the invention a substitution by chemical reaction occurs and not only a physical change of the surface.

A similar but smaller effect is obtained if the propyleneoxide sulfonic potassium is replaced by glycidic acid potassium.

*Example 11.*—A degummed natural silk is treated in the same manner as has been described in Example 10 for treating wool. The result as to the dyeing properties is the same. The affinity to acid dyes is reduced and the affinity to basic dyes is increased.

*Example 12.*—Wool yarn is thoroughly wetted with water containing small quantities of a wetting agent, thoroughly centrifuged and for 12 hours exposed to the action of a mixture of epichlorhydrine vapor and air at a temperature of 40° C., the quantity of epichlorhydrine amounting to 20% of that of the wool and the vessel in which the reaction is carried out having 50 parts by volume as compared with that of the applied wool. The affinity of the treated wool for dyes or dyestuff components containing acid groups, for instance, Alizarine Direct Blue A, Thiazine Red R or Indigosol Green IBA (Schultz Farbstofftabellen, 7th edition, suppl. vol. 1, page 109 is extraordinarily increased. A similar, but not so strong effect is obtained if the dry wool is treated with a mixture of epichlorhydrine vapor and air containing 75% of relative moisture under the same conditions. It must be assumed that the primary product of reaction is changed further by intramolecular alkylation.

*Example 13.*—Wool is impregnated with a 5 per cent solution of piperidopropenoxideacetate, centrifuged and heated for 16 hours to 40° C. The affinity to dyestuffs is considerably increased. A still stronger effect is obtained by application of the free base, but the strong alkaline reaction is mostly not desired. Instead of the piperidopropenoxideacetate there may also be used the product of addition from dimethylsulfate and piperidopropenoxide.

*Example 14.*—A fiber mixture of two thirds of glossy acetate silk cut into staples and one third of wool is treated at 50 to 20° C. with a finely dispersed melt of olein containing about 50% of epichlorhydrine calculated on the quantity of olein. The fiber mass obtained by removing the excess of olein and still containing 10 per cent of olein is kept in closed vessels for 12 hours at a temperature of 60° C. Hereafter the material is worked up in the usual manner. There is obtained a yarn which in spite of its low content of wool which shows good blending effects and uses up the dye very well at a temperature at which the acetate silk is not attacked.

*Example 15.*—Wool is treated with a 3 per cent solution of 1-N-perhydrocarbazolyl-2.3-propenoxideacetate at 40 to 50° C. and then heated at 50 to 55° C. for 16 hours. The affinity to said dyes is increased.

*Example 16.*—Zephyr wool yarn is treated with a 3 per cent solution of 1-dodecylmethylamino-2.3-propenoxide-hydrochloride at 50° C. and is heated to 50° C. for 16 hours after having been centrifuged. Acid dyes dye the material a darker tint, and there is obtained a softening effect which stands washing.

The term "protein material" used in the claims is intended to include naturally or artificially shaped articles or materials consisting of or containing protein substances or derivatives or conversion products thereof.

By the expression "structured proteinous material" as used in the appended claims are intended normally solid naturally or artificially shaped articles or materials which consist of or contain protein substances such as wool, natural silk, fibroin artificial silk, pelts, feathers, horsehair, horn, casein-containing materials, gelatine sheets or capsules, tanned or raw hides and the like, as opposed to solutions or dispersions of protein substances.

What I claim is:

1. A process for increasing the reactivity of a structured protein material towards treating agents of acid character which comprises subjecting the material to the action of an alkylating agent selected from the group consisting of alkylene oxides, alkylene imines and alkylene sulfides under conditions not involving a change of structure of the parent material, whereby there is produced a water-insoluble proteinous article of the same physical form as said parent material.

2. A process for increasing the reactivity of a structured protein material towards treating agents of acid character which comprises subjecting the material to the action of an alkylating agent in gaseous condition selected from the group consisting of alkylene oxides, alkylene imines and alkylene sulfides under conditions not involving a change of structure of the parent material, whereby there is produced a water-insoluble proteinous article of the same physical form as said parent material.

3. A process for increasing the reactivity of a structured protein material towards treating agents of acid character which comprises subjecting the material to the action of an alkylating agent selected from the group consisting of alkylene oxides, alkylene imines and alkylene sulfides under conditions not involving a change of structure of the parent material, whereby there is produced a water-insoluble proteinous article of the same physical form as said parent material in the presence of a catalyst.

4. A process for increasing the reactivity of a structured protein material towards treating agents of acid character which comprises subjecting the material to the action of an alkylating agent selected from the group consisting of alkylene oxides, alkylene imines and alkylene sulfides under conditions not involving a change of structure of the parent material, whereby there is produced a water-insoluble proteinous article of the same physical form as said parent material in a slightly acid medium at the beginning of the reaction.

5. A process for increasing the reactivity of a structured protein material towards treating agents of acid character which comprises subjecting the material to the action of 1.2-alkyleneimines under conditions not involving a change of structure of the parent material, whereby there is produced a water-insoluble proteinous article of the same physical form as said parent material.

6. A structured water-insoluble proteinous material consisting partly or wholly of keratine and containing hydroxyalkyl groups, said hydroxyalkyl groups having in their radical an acid group.

7. A structured water-insoluble proteinous material consisting partly or wholly of keratine and containing hydroxyalkyl groups, said hydroxyalkyl groups having in their radical a sulfogroup.

8. A structured textile material insoluble in acid aqueous liquids, said structured textile material consisting partially or wholly of keratine containing in its molecule hydroxyalkyl groups, said hydroxyalkylated keratine material being characterized over similarly structured but non-hydroxyalkylated keratine material by an enhanced reactivity towards dyestuffs containing acid groups.

9. A wool product having the same structural characteristics as naturally occurring wool, the wool product being characterized over natural wool by an enhanced reactivity towards dyestuffs containing acid groups and by containing in its molecule hydroxyalkyl groups.

PAUL SCHLACK.